US007613661B2

(12) United States Patent
Nambudiri

(10) Patent No.: US 7,613,661 B2
(45) Date of Patent: Nov. 3, 2009

(54) METHOD AND SYSTEM FOR DETECTING DUPLICATE PRINTING OF INDICIA IN A METERING SYSTEM

(75) Inventor: Easwaran Nambudiri, Rye Brook, NY (US)

(73) Assignee: Pitney Bowes Inc., Stamford, CT (US)

( * ) Notice: Subject to any disclaimer, the term of this patent is extended or adjusted under 35 U.S.C. 154(b) by 349 days.

(21) Appl. No.: 11/497,778

(22) Filed: Aug. 2, 2006

(65) Prior Publication Data

US 2008/0033891 A1 Feb. 7, 2008

(51) Int. Cl.
*G06F 17/60* (2006.01)
*G06K 9/00* (2006.01)

(52) U.S. Cl. .......................... 705/62; 705/60; 382/101; 382/181

(58) Field of Classification Search .................. 705/62, 705/410, 60; 382/101, 181
See application file for complete search history.

(56) References Cited

U.S. PATENT DOCUMENTS

| | | | | |
|---|---|---|---|---|
| 5,999,921 | A * | 12/1999 | Arsenault et al. | 705/410 |
| 6,058,190 | A | 5/2000 | Cordery et al. | |
| 6,318,856 | B1 | 11/2001 | Sansone | |
| 6,361,164 | B1 | 3/2002 | Sansone | |
| 6,442,276 | B1 * | 8/2002 | Doljack | 380/51 |
| 6,549,640 | B1 | 4/2003 | Sansone et al. | |
| 6,688,742 | B2 * | 2/2004 | Sansone | 347/107 |
| 6,782,116 | B1 * | 8/2004 | Zhao et al. | 382/100 |
| 6,839,693 | B1 | 1/2005 | Cordery et al. | |
| 2002/0087494 | A1 * | 7/2002 | Herbert | 705/408 |
| 2003/0120922 | A1 * | 6/2003 | Sun et al. | 713/168 |
| 2005/0091170 | A1 * | 4/2005 | Nambudiri | 705/62 |

FOREIGN PATENT DOCUMENTS

WO 2005/059753 A1 12/2004

OTHER PUBLICATIONS

Chandramouli et al., How Many Pixels to Watermark?, IEEE Comput. Soc, Los Alamitos, CA, 2000.*

* cited by examiner

*Primary Examiner*—John W Hayes
*Assistant Examiner*—Kevin Flynn
(74) *Attorney, Agent, or Firm*—Brian A. Lemm; Angelo N. Chaclas

(57) ABSTRACT

A method of detecting possible duplicate printing of postal indicia including receiving image data for printing a current postal indicium, determining a number of pixels that will be printed in a defined zone of the current postal indicium, obtaining stored pixel count data that includes one or more stored pixel counts that each represents a number of pixels that were printed in the defined zone of a previously printed postal indicium, determining whether the number of pixels equals any one of the stored pixel counts, initiating one or more fraud prevention actions if it is determined that the number of pixels equals any one of the stored pixel counts, and printing the current postal indicium if it is determined that the number of pixels does not equal any one of the stored pixel counts. Also, a mail processing system adapted to implement the method just described.

30 Claims, 3 Drawing Sheets

METHOD AND SYSTEM FOR DETECTING DUPLICATE PRINTING OF INDICIA IN A METERING SYSTEM

FIELD OF THE INVENTION

The present invention relates to mail processing systems and the printing of postal indicia, and in particular to a method and system for preventing fraud by detecting possible duplicate printing of postal indicia based upon the number of pixels used in printing postal indicia.

BACKGROUND OF THE INVENTION

Mail processing systems, such as, for example, a mailing machine, often include different modules that automate the processes of producing mail pieces. The typical mailing machine includes a variety of different modules or sub-systems, each of which performs a different task on the mail piece. The mail piece is conveyed downstream utilizing a transport mechanism, such as rollers or a belt, to each of the modules. Such modules could include, for example, a singulating module for separating a stack of mail pieces such that the mail pieces are conveyed one at a time along the transport path, a stripping/moistening module for stripping open the flap of an envelope and wetting and sealing the glued flap of an envelope, a weighing module for weighing the mail piece, and a metering/printing module for storing postage amounts and applying evidence of postage either directly to the mail piece or to a tape to be applied to the mail piece. The mailing machine is controlled by a central processing unit that executes software stored in memory provided in the mailing machine. The exact configuration of the mailing machine is, of course, particular to the needs of the user.

The metering/printing modules of many current mailing machines utilize ink jet printing technology to print evidence of postage, such as postal indicia. Generally, an ink jet printer includes one or more arrays of nozzles (sometimes referred to as orifices), a supply of ink, a plurality of ejection elements (for example, expanding vapor bubble elements or piezoelectric transducer elements) corresponding to the nozzles and suitable driver and control electronics for controlling the ejection elements. Typically, the one or more arrays of nozzles and the ejection elements along with their associated components are referred to as a print head. It is the activation of the ejection elements that causes drops of ink to be expelled from the nozzles. The ink ejected in this manner forms drops which travel along a flight path until they reach a print medium such as a sheet of paper, an envelope or the like. Once they reach the print medium, the drops dry and collectively form a printed image, such as a Digital Postage Mark (DPM). Typically, the ejection elements are selectively activated (energized) or not activated (not energized) to expel or not expel, respectively, drops of ink as relative movement is provided between the print head and the print medium so that a predetermined or desired print image is achieved.

The postal services of many countries around the world permit and/or require the printing of DPMa that include two dimensional barcodes. DPMs typically include a number of information items in human readable and/or machine readable form, such as, and without limitation, the paid postage amount, the date and time the indicium was generated, the identification number of the postage meter used to generate the indicium, the ascending register value, a postal service symbol, the class of service desired for the mailpiece, the addressee ZIP code and/or address, and the sender's name and/or address. For example, the United States Postal Service has implemented a program known as the Information Based Indicia Program (IBIP) which permits a user to generate a postage indicium for sending a mailpiece (e.g., letter, package, etc.) that includes a human readable portion and a machine readable portion in the form of a two dimensional barcode, such as, without limitation, a Data Matrix symbol.

As is known, a two dimensional barcode, such as a Data Matrix symbol, typically consists of a number of data regions having nominally square modules arranged in an array, wherein each module generally represents one bit of data. For a black on white Data Matrix symbol, for instance, a darkened (i.e., filled) module represents a binary "one" and a light (e.g., empty) module represents a binary "zero." Each darkened module typically consists of multiple printed pixels. For example, a darkened module may consist of 25 pixels arranged in a 5×5 pixel pattern. In a mailing machine where ink jet printing is used, each drop of ink is a pixel. The data regions in a two dimensional barcode are usually surrounded by a finder pattern which, in turn, is surrounded by a quiet zone border. In addition, multiple data regions may be separated by an alignment pattern.

The two dimensional barcodes employed in many DPMs, such as the Data Matrix symbol in an IBIP indicium, also include encrypted information, such as the postage amount and other postal data relating to the mailpiece and the postage meter that printed the indicium (usually referred to as a digital token or a digital signature), that may be used by the particular postal service in question to authenticate the indicia after the mailpieces have been placed into the mail stream for delivery. However, the improvement of photocopying, printing and scanning equipment over time has made it easier to commit fraud by copying and reusing postal indicia. Thus, there is a need for a system and method for preventing fraudulent duplication and reuse of DPMs that are printed using ink-j et printing technologies.

SUMMARY OF THE INVENTION

The present invention, in one embodiment, provides a method of preventing fraud by detecting possible duplicate printing of postal indicia by a mail processing system. The method includes receiving image data for printing a current postal indicium, and determining from the image data a number of pixels, e.g., the number of ink drops in the case of ink jet printing, that will be printed in a defined zone of the current postal indicium. The method further includes obtaining stored pixel count data that includes a plurality of stored pixel counts. Each of the stored pixel counts represents the number of pixels that were printed in the defined zone of one or more prior postal indicia previously printed by the mail processing system. The method then includes determining whether the number of pixels equals any one of the stored pixel counts, initiating one or more fraud prevention actions if it is determined that the number of pixels equals any one of the stored pixel counts, and printing the current postal indicium based upon the image data if it is determined that the number of pixels does not equal any one of the stored pixel counts. Preferably, the method further includes updating the stored pixel count data to include the number of pixels if it is determined that the number of pixels does not equal any one of the stored pixel counts.

The one or more fraud prevention actions may include, without limitation, preventing further printing of indicia by the mail processing system, and/or causing the mail processing system to provide a message indicating possible fraud to a third party such as a post or a party administering the purchase and use of postage funds.

The current postal indicium and each prior postal indicium may include a two dimensional barcode. In such case, the defined zone may include a portion of or all of the two dimensional barcode. In addition, the defined zone may include at least a portion of a human readable portion of the current postal indicium and each prior postal indicium. Furthermore, the defined zone may change, such as, for example, after each time the mail processing system is powered up, after a predetermined time period has expired, after a predetermined number of indicia have been printed, or after a predetermined number of maintenance operations have been performed. In one particular embodiment, the defined zone at each power up session is determined based upon a characteristic of the mail processing system, such as, without limitation, the current value of the ascending register of the mail processing system. The image data, in another particular embodiment, includes data for printing the number of pixels in at least one of human readable and encoded human readable form.

The present invention, in another embodiment, relates to a mail processing system capable of detecting possible duplicate printing of postal indicia that includes a printer, such as a an ink jet printer, a processor, such as a print head controller, in electronic communication with the printer, and a memory. The memory stores one or more routines executable by the processor and the stored pixel count data as described above. The one or more routines include instructions for implanting one or more of the various embodiments of the method described above.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
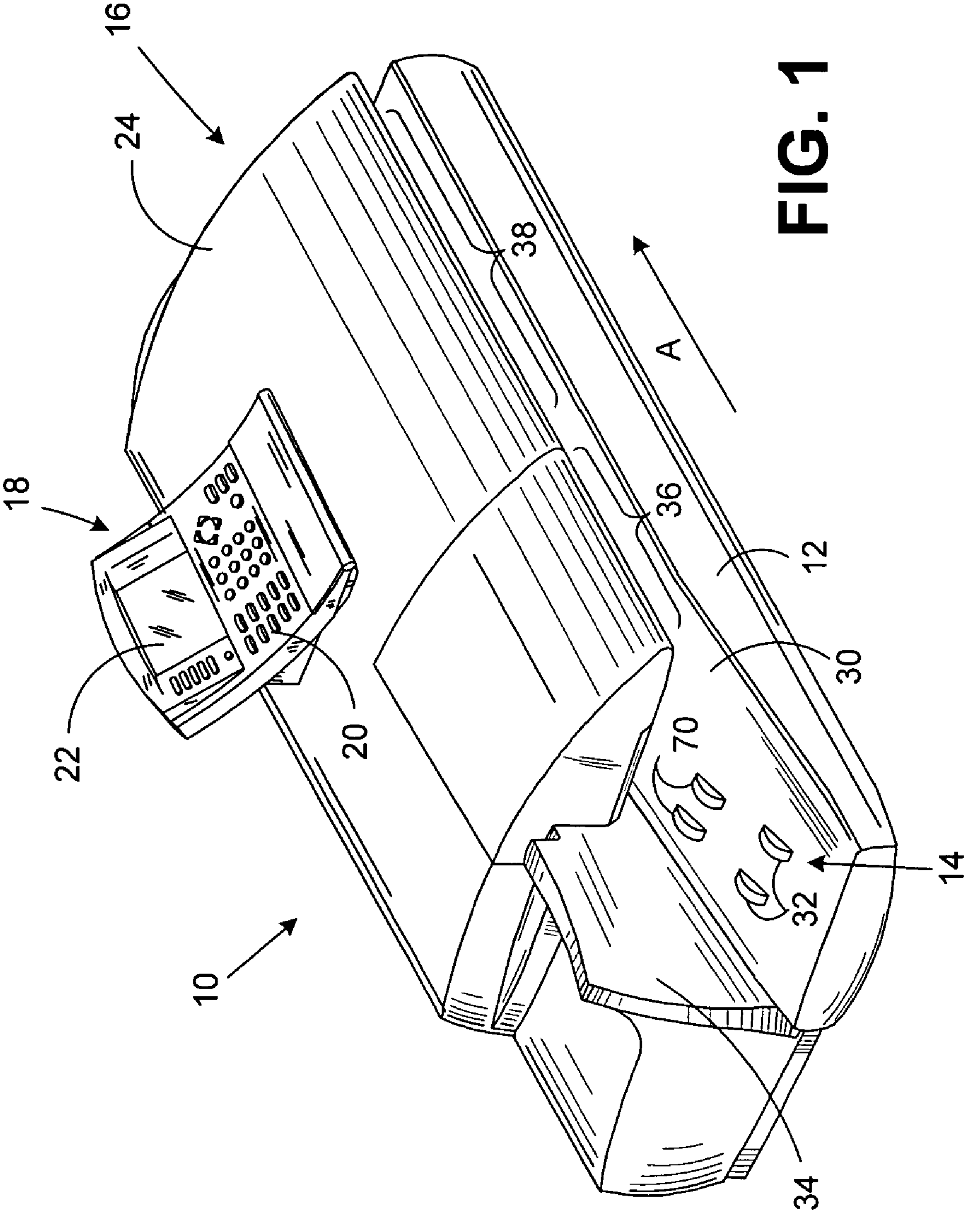
FIG. 1 is an isometric view of a mail processing system according to the present invention.

Referring to FIG. 1, an isometric view of a mail processing system 10, such as a mailing machine, according to an embodiment of the present invention is shown. Mail processing system 10 comprises a base unit, designated generally by the reference numeral 12, the base unit 12 having a mail piece input end, designated generally by the reference numeral 14, and a mail piece output end, designated generally by the reference numeral 16. A User Interface Controller (UIC) 18 is fixedly mounted on the base unit 12, and includes one or more input/output devices, such as, for example, a keyboard 20 and a display device 22. One or more cover members 24 are pivotally mounted on the base 12 so as to move from the closed position shown in FIG. 1 to an open position (not shown) so as to expose various operating components and parts for service and/or repair as needed.

The base unit 12 further includes a horizontal feed deck 30 that extends substantially from the input end 14 to the output end 16. A plurality of nudger rollers 32 are suitably mounted under the feed deck 30 and project upwardly through openings in the feed deck so that the periphery of the rollers 32 is slightly above the upper surface of the feed deck 30 and can exert a forward feeding force on a succession of mail pieces placed in the input end 14. A vertical wall 34 defines a mail piece stacking location from which the mail pieces are fed by the nudger rollers 32 along the feed deck 30 and into a transport mechanism (not shown) that transports the mail pieces in a downstream path of travel, as indicated by arrow A, through one or more modules, such as, for example, a separator module and moistening/sealing module. Each of these modules is located generally in the area indicated by reference numeral 36. The mail pieces are then passed to a metering/printing module (including print head controller 44 and ink jet print head 46 shown in FIG. 2) located generally in the area indicated by reference numeral 38, and exit the mailing processing system 10 at the output end 16.

Figure 2:
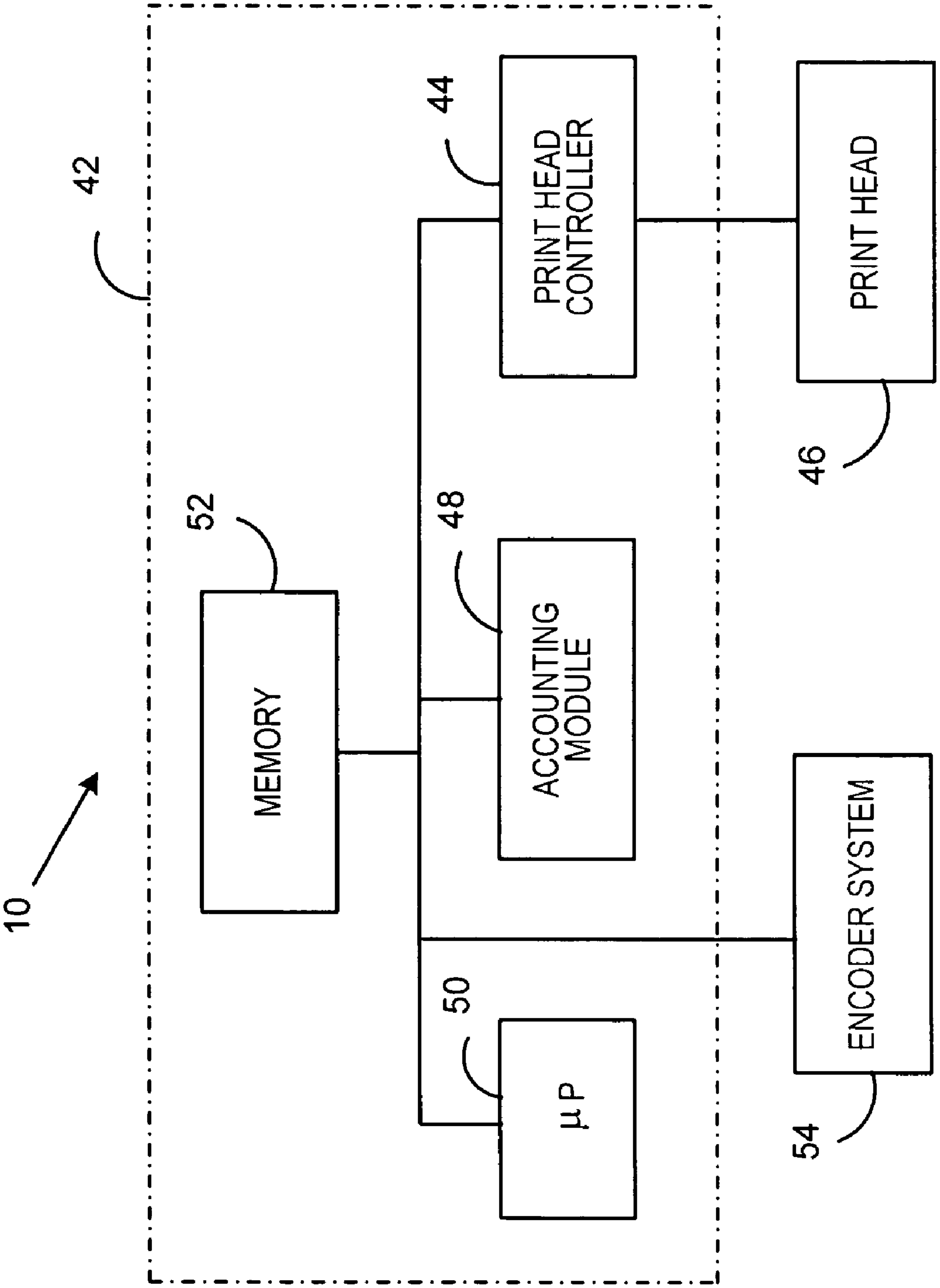
FIG. 2 is a block diagram showing certain components of the mail processing system of FIG. 1.

FIG. 2 is a block diagram showing certain components of the mail processing system 10 according to an embodiment of the present invention. As seen in FIG. 2, the mail processing system 10 includes a micro control system 42 which may be of any suitable combination of microprocessors, firmware and software. The micro control system 42 includes a print head controller 44 having a suitable processor and memory which is in operative communication with ink jet print head 46, an accounting module 48 (e.g., a postage meter or postal security device (PSD)) for tracking and managing postal funds, a microprocessor 50, and a memory 52. Print head controller 44 and accounting module 48 can optionally be separate microprocessor systems that include operating systems, memory, and other peripherals. Ink jet print head 46 may be any type of ink jet print head (e.g., thermal (bubble) ink jet or piezoelectric ink jet). Additionally, the micro control system 42 is in operative communication with an encoder system 54 for receiving signals indicating an appropriate change of state of the encoder system 54. These signals are used by the print head controller 44 to generate and control the timing of firing pulses for ink jet print head 46. In response to the firing pulses, selected nozzles are activated, thereby ejecting ink (each firing pulse in conjunction with a selected nozzle will cause the ejection of a corresponding drop of ink from that nozzle). Those skilled in the art will recognize that the various components of the micro control system 42 are in operative communication with each other over conventional communication lines, such as a communication bus.

As described elsewhere herein, many postal services around the world provide for the use of Digital Postage Marks that include two dimensional barcodes having various types of information included therein, including encrypted information that may be used for later authentication of the DPM printed on the mailpiece. The mail processing system 10 described above may be used to print such DPMs using the print head controller 44 and the ink jet print head 46. As will be appreciated, the barcode information for each DPM that is printed will be different due to the nature and inherent variability of the data elements included in the barcode (e.g., the postage value, ascending register value, and addressee information) and due to the randomness that is included in the generation of the encrypted information that is included in the barcode, typically in the form of a digital signature. Thus, the number of and position of the darkened (e.g., black) and light (e.g., white) modules of each two dimensional barcode forming a part of a printed DPM will be different. In addition, it is common practice to dither the number of pixels in the module of a two dimensional barcode such that the number of pixels used in each darkened module is variable throughout the barcode, based on the adjacency of the dark module to a light module. Typically, this dithering is performed along the direction of the media movement to optimize several characteristics of the quality of the printed image such as print growth on the media and the control of misty spots.

Thus, due to the variability of the information included in the barcodes and/or the dithering, if employed, each barcode generated as part of a DPM by the mail processing system 10 will employ or include a different number of pixels (relative to the other barcodes generated by the mail processing system 10). Furthermore, because each pixel corresponds to a drop of ink emitted by the print head 46, each DPM will have a different ink drop count. As described in greater detail below, this ink drop count variability is used to detect and prevent duplicate printing and/or use of DPMs in the mail processing system 10.

Figure 3:
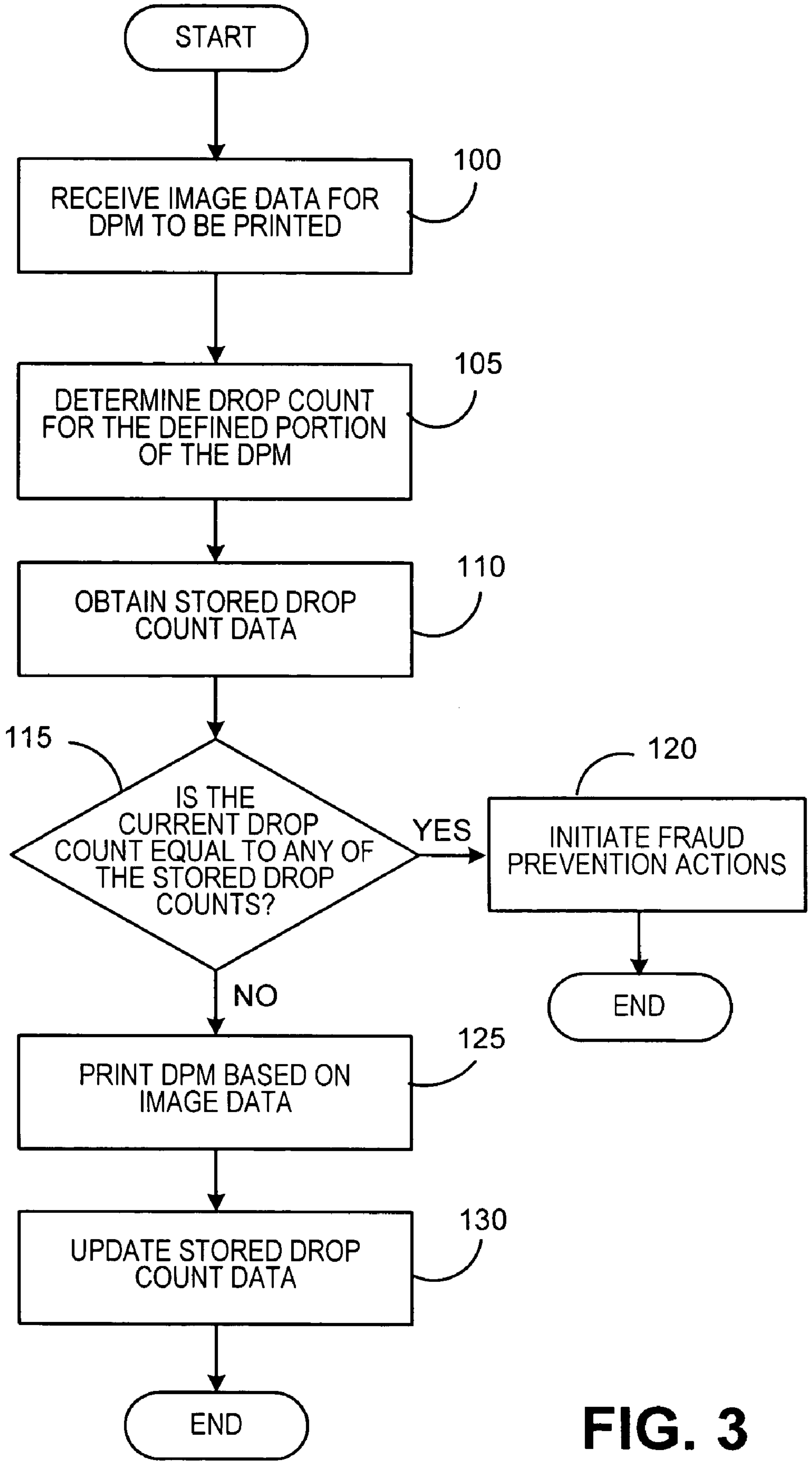
FIG. 3 is a flowchart showing a method of printing evidence of postage payment that includes a two dimensional barcode that detects and prevents duplicate printing of the evidence of postage payment

FIG. 3 is a flowchart showing a method of printing evidence of postage payment that includes a two dimensional barcode that detects and prevents duplicate printing of the evidence of postage payment. As will be appreciated, the method steps described herein may be implemented in one or more routines stored in the memory 52 and executed by the print head controller 44 and/or microprocessor 50. As is known, when a DPM is to be printed by the mail processing system 10, image data commonly referred to as a nozzle map is generated in advance, typically by any one of the microprocessor 50, print head controller 44, or accounting module 48, or any combination thereof. The nozzle map is sent to the print head controller and is used thereby to cause the print head 46 to print the specified image, i.e., the specified DPM. Each nozzle map includes data that identifies each firing pulse, and the timing thereof, that is necessary to properly print the corresponding DPM. Each nozzle map will thus include data that identifies each pixel as dark or light and the timing and position thereof to properly print the corresponding DPM. Each nozzle map will thus include data that identifies each pixel characteristic required to print the two dimensional barcode forming a part of the DPM. As described above, the nozzle map data will therefore include data that specifies the number of drops of ink that will be used in printing the DPM and in particular the two dimensional barcode. As described below, that ink drop count is used in a method to detect and prevent fraud. In addition, according to an aspect of this embodiment of the present invention, the memory 52, or alternatively some other internal or external memory associated with the print head controller 44, stores data identifying the ink drop count used to print a predetermined number of previous DPM printed by the mail processing system, which, as described below, are used in the method of detecting and preventing fraud described herein.

Referring to FIG. 3, the method begins at step 100, wherein the print head controller 44 receives image data for a DPM that is to be printed on a mailpiece (either directly or on a label to be attached to the mailpiece). At step 105, the drop count, i.e., the number of dark pixels and thus the number of drops of ink, for a defined portion or zone of the DPM to be printed is determined from the image data. The defined zone of the DPM that is used is determined in advance and may be any of a number of different portions or zones, including, without limitation, the entire two dimensional barcode, a selected portion of the barcode, the entire DPM (including human readable portions) a selected portion of the human readable portion of the DPM (possibly including an image such as an eagle or the like), or all or a selected portion of the barcode along with all or a selected portion of the remainder of the DPM. In the preferred embodiment, the defined zone of the DPM that is used includes at least a portion of the two dimensional barcode to take advantage of the drop count variability discussed elsewhere herein. However, it should be understood that the human readable portions of the DPMs will also include variability as a result of the changes in certain of the information included therein (e.g., postage amount, addressee information, etc.).

Next, at step 110, the drop count data for the defined zone of a predetermined number of DPM printed before the current DPM (e.g., without limitation, the last ten DPMs printed before the current DPM) is obtained from storage. At step 115, a determination is made as to whether the drop count determined at step 105 is equal to any of the drop counts obtained from storage in step 110. If the answer at step 115 is yes, then that is an indication of possible duplication fraud due to the fact that it is highly unlikely that the defined zones of any of the DPMs in question (especially if the zones include at least a portion of the barcode) will include the exact same number of ink drops. As a result, if the answer at step 115 is yes, then, at step 120, one or more fraud prevention actions are initiated. Such actions may include, without limitation, shutting down or locking out the mail processing system 10 and/or sending an electronic message to the party that administers the use of the mail processing system 10 and/or the purchase of postal funds for the mail processing system 10.

If the answer at step 115 is no, meaning that no drop count match was detected, then, at step 125, the DPM is printed. Specifically, the print head controller 44, based on the image data it received, sends appropriately timed firing pulses to the print head 46 to cause the print head 46 to print the DPM onto a mailpiece or a label to be applied to a mailpiece. Next, at step 130, the stored drop count data is updated to include the drop count data for the DPM just printed. Preferably, step 130 involves adding the drop count data for the DPM just printed and deleting the drop count data for the "oldest" DPM being stored (i.e., the DPM having the earliest time of printing of the stored DPMs).

In an alternative embodiment, the image data received in step 100 and printed in step 125 may include data for printing, in human readable or encoded human readable form (e.g., as part of the printed barcode), the drop count data for the defined zone of the DPM. As will be appreciated, the printed drop count data may later be used by a third party, such as a postal service, when examining a batch of mailpieces to determine wither duplication fraud may have been committed. Specifically, when examining a batch of mailpieces processed by a system such as the mail processing system 10, if the third party sees duplicate drop count numbers, that party will be alerted to possible fraud and can therefore take appropriate action.

According to still another alternative embodiment, the defined zone used in the method shown in FIG. 3 for the mail processing machine 10 may be changed from one power up session to another power up session. For example, the defined zone could include columns 1 through 250 of the two dimensional barcode of the DPM to be printed for one session and columns 251-500 of the two dimensional barcode for another session, and so on. In addition, as a further alternative, a preset number of such defined zones may be established for the mailing machine 10, the particular one of those defined zones that is used in any power up session may be selected based on a particular characteristic of the mail processing system 10. For example, the defined zone could be changed to one of ten preset zones based on the last digit of the ascending register of the mail processing system 10 at power up. As will be appreciated, any time that the defined zone is so changed, the stored drop count data should be reset to avoid errors. As another alternative, the defined zone used in the method shown in FIG. 3 may be changed after a predetermined time period has expired after power up, such as for example, after some number of hours. As another alternative, the defined zone used in the method shown in FIG. 3 may be changed after a predetermined number of indicia have been printed, such as, for example, 500, 1000, etc. As another alternative, the defined zone used in the method shown in FIG. 3 may be changed after a predetermined number of maintenance operations have been performed on the print head 46, such as, for example, after some predetermined number of cappings, wipings or spittings.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of detecting possible duplicate printing of postal indicia by a mail processing system, comprising:

receiving image data for printing a current postal indicium;

determining, by a processing device, from said image data a number of pixels that will be printed in a defined zone of said current postal indicium;

obtaining stored pixel count data, said stored pixel count data including one or more stored pixel counts, each of said stored pixel counts representing a number of pixels that were printed in the defined zone of a prior postal indicium previously printed by said mail processing system;

determining whether said number of pixels equals any one of said stored pixel counts;

initiating one or more fraud prevention actions if it is determined that said number of pixels equals any one of said stored pixel counts; and printing said current postal indicium based upon said image data if it is determined that said number of pixels does not equal any one of said stored pixel counts.

2. The method according to claim 1, further comprising updating said stored pixel count data to include said number of pixels if it is determined that said number of pixels does not equal any one of said stored pixel counts.

3. The method according to claim 1, wherein said one or more fraud prevention actions includes preventing further printing of indicia by said mail processing system.

4. The method according to claim 1, wherein said one or more fraud prevention actions includes causing said mail processing system to provide a message indicating possible fraud to a third party.

5. The method according to claim 1, wherein said mail processing system prints said postal indicia using ink jet printing techniques, wherein said number of pixels is an ink drop count representing a number of ink drops that will be used in the defined zone of said current postal indicium, and wherein each of said stored pixel counts is a stored ink drop count.

6. The method according to claim 1, wherein said current postal indicium and each said prior postal indicia include a two dimensional barcode, and wherein said defined zone includes at least a portion of said two dimensional barcode.

7. The method according to claim 6, wherein said defined zone includes all of said two dimensional barcode.

8. The method according to claim 6, wherein said defined zone includes at least a portion of a human readable portion of said current postal indicium and each said prior postal indicia.

9. The method according to claim 1, wherein the defined zone changes based on predetermined criteria.

10. The method according to claim 9, wherein the predetermined criteria is each time said mail processing system is powered up.

11. The method according to claim 10, wherein said defined zone at each power up session is determined based upon a characteristic of said mail processing system.

12. The method according to claim 9, wherein the predetermined criteria is a predetermined period of time.

13. The method according to claim 9, wherein the predetermined criteria is a predetermined number of print operations performed by the mail processing system.

14. The method according to claim 9, wherein the predetermined criteria is a predetermined number of maintenance operations performed on a print head of the mail processing system.

15. The method according to claim 1, wherein said image data includes data for printing said number of pixels in at least one of human readable and encoded human readable form.

16. A mail processing system capable of detecting possible duplicate printing of postal indicia, comprising:

a printer;

a processor in electronic communication with said printer; and a memory, said memory storing one or more routines executable by said processor and stored pixel count data, said stored pixel count data including one or more stored pixel counts, each of said stored pixel counts representing a number of pixels that were printed in a defined zone of a prior postal indicium previously printed by said printer, said one or more routines including instructions for:

receiving image data for printing a current postal indicium;

determining from said image data a number of pixels that will be printed in the defined zone of said current postal indicium;

obtaining from said memory said stored pixel count data;

determining whether said number of pixels equals any one of said stored pixel counts;

initiating one or more fraud prevention actions if it is determined that said number of pixels equals any one of said stored pixel counts; and causing said printer to print said current postal indicium based upon said image data if it is determined that said number of pixels does not equal any one of said stored pixel counts.

17. The mail processing system according to claim 16, said one or more routines further including instructions for updating said stored pixel count data in said memory to include said number of pixels if it is determined that said number of pixels does not equal any one of said stored pixel counts.

18. The mail processing system according to claim 16, wherein said one or more fraud prevention actions includes preventing further printing of indicia by said mail processing system.

19. The mail processing system according to claim 16, wherein said one or more fraud prevention actions includes causing said mail processing system to provide a message indicating possible fraud to a third party.

20. The mail processing system according to claim 16, wherein said printer comprises an ink jet print head and wherein said processor comprises a print head controller operatively associated with said ink jet print head, wherein said number of pixels is an ink drop count representing a number of ink drops that will be printed by the ink jet print head in the defined zone of said current postal indicium, and wherein each of said stored pixel counts is a stored ink drop count.

21. The mail processing system according to claim 16, wherein said current postal indicium and each said prior postal indicium include a two dimensional barcode, and wherein said defined zone includes at least a portion of said two dimensional barcode.

22. The mail processing system according to claim 21, wherein said defined zone includes all of said two dimensional barcode.

23. The mail processing system according to claim 21, wherein said defined zone includes at least a portion of a human readable portion of said current postal indicium and each said prior postal indicium.

24. The mail processing system according to claim 16, said one or more routines further including instructions for changing the defined zone based on predetermined criteria.

25. The mail processing system according to claim 24, wherein the predetermined criteria is each time said mail processing system is powered up.

26. The mail processing system according to claim 25, wherein said defined zone at each power up session is determined based upon a characteristic of said mail processing system.

27. The mail processing system according to claim 24, wherein the predetermined criteria is a predetermined period of time.

28. The mail processing system according to claim 24, wherein the predetermined criteria is a predetermined number of print operations performed by the mail processing system.

29. The mail processing system according to claim 24, wherein the predetermined criteria is a predetermined number of maintenance operations performed on the printer.

30. The mail processing system according to claim 16, wherein said image data includes data for causing said printer to print said number of pixels in at least one of human readable and encoded human readable form.

* * * * *